April 22, 1969  E. STEINGROEVER  3,440,527

MAGNETIC THICKNESS GAUGE HAVING SHIELDED MAGNET

Filed July 8, 1966

United States Patent Office 3,440,527
Patented Apr. 22, 1969

3,440,527
MAGNETIC THICKNESS GAUGE HAVING
SHIELDED MAGNET
Erich Steingroever, 33 Flensburger Strasse,
Bonn, Germany
Filed July 8, 1966, Ser. No. 563,814
Claims priority, application Germany, July 19, 1965,
N 27,058
Int. Cl. G01r 33/02, 33/06
U.S. Cl. 324—34      1 Claim

ABSTRACT OF THE DISCLOSURE

A magnetic thickness gauge for measuring the thickness of a non-metallic material on a ferromagnetic support including a permanent magnet having its polar axis disposed parallel to the axis of the material to be measured, pole pieces on each end of the magnet having hemispherical surfaces projecting from one end towards the material to be measured for contact therewith, the other ends of the pieces defining an air gap for completing the magnetic circuit and a Hall effect device is disposed in such air gap to measure the magnetic flux therein.

---

Figure 1:
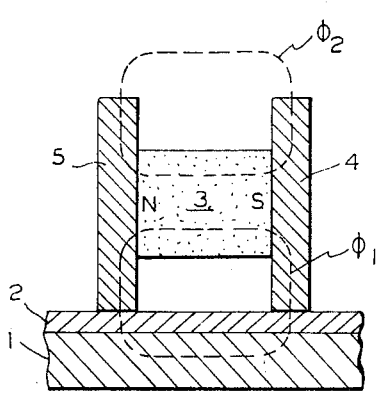

This invention relates to a means for determining the thickness of non-magnetic layers or coatings on iron or other ferromagnetic supports.

It is known to measure the thickness of such layers with devices using a magnetic alternating field where on moving a coil closer to the surface to be tested the magnetic leakage flux is affected; in this way, the impedance of the coil can be modified, the phase relation of the measuring circuit can be turned, or the resonance frequency can be shifted. However, in such known thickness checkers, the measurement depends on the conductivity of the layer to be checked because eddy currents may appear in the metallic layer which react on the testing circuit. Therefore, when testing the thickness of metal coatings, a specific calibration for the various metals (e.g. copper, zinc, non-magnetic steels, chromium) and for their alloys and for non-metallic layers like lacquers or enamels is necessary.

Other thickness checking devices use a static magnetic field.

In another known apparatus, the force required to separate a bar-shaped permanent magnet from the surface to be checked is measured by means of a spring. Said apparatus has a considerable magnetic leakage field at the opposite end of the bar magnet so as to render measurements in bores, pipes and the like impossible.

In another well known magnetic thickness gauge, a field produced by a permanent magnet is modified by the approach or removal of a magnetic measuring circuit from the ferromagnetic support. In said field, there is provided a moving coil or moving magnet system whose movement is an indication of the thickness of the layer to be checked. In such a device, there is a considerable leakage flux of the permanent magnet system which makes it impossible to use the instrument in bores, pipes, or between narrow walls. It is another drawback of the system that the indication is directly on the measuring head member which for measurements in difficultly accessible areas, e.g., at the inner wall of containers, frequently cannot be observed.

It is a principal object of the invention to provide a magnetic thickness gauge which is not subject to the above-discussed disadvantages and problems.

Other objects and advantages will become apparent from a consideration of the specification and claim.

In the magnetic thickness gauge of the invention, the approach to the ferromagnetic support modifies a magnetic flux whose strength is an indication of the thickness of the layer. For this purpose, the flux of a permanent magnet is divided into two partial fluxes, the one passing into the support through the layer to be measured, while the other is passed through the air gap portion arranged at the side of the magnet which is averted from the support. The measuring system, therefore, has approximately the form of an H, where one or more measuring devices are arranged on, or in front of, the legs of the H.

The invention will be better understood from the following description of an embodiment, taken in connection with the accompanying drawings.

Figure 2:
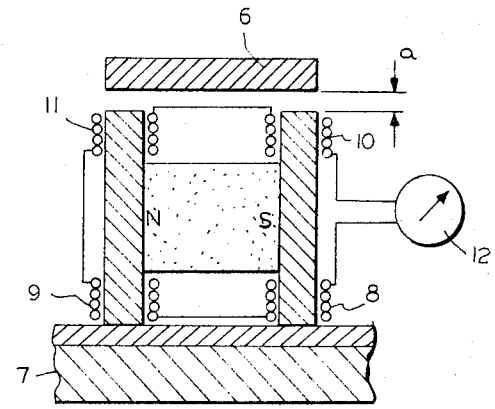
Figure 3:
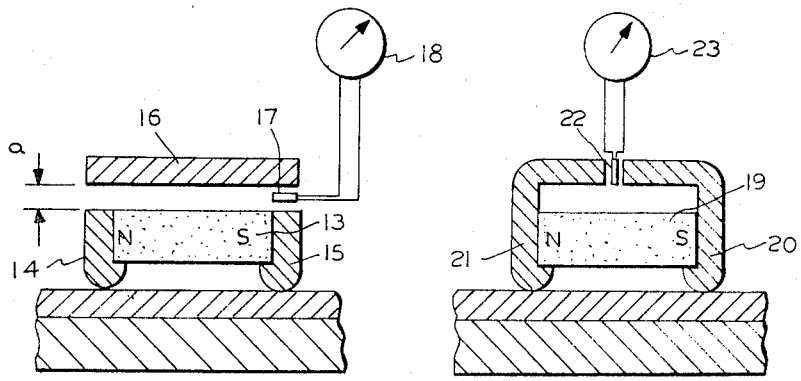
Figure 4:
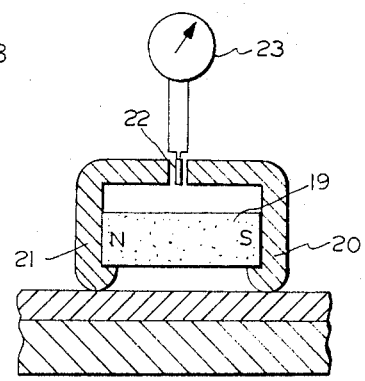
Figure 5:
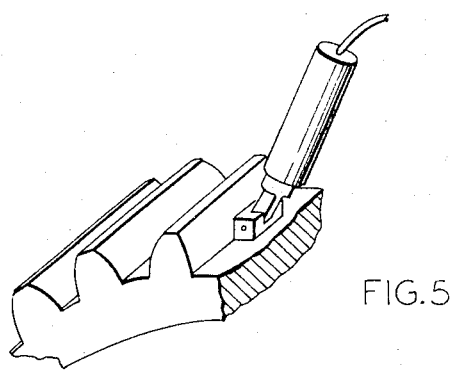

In the drawings, FIG. 1 is a sectional view of an arrangement diagrammatically illustrating the principle of the invention;

FIGS. 2–4 show practical measuring arrangements embodying the principle of FIG. 1, and FIG. 5 is a partial perspective view showing diagrammatically the application of such apparatus to the measurement of the thickness of layers on gear flanks.

In the drawings, the ferromagnetic supporting member is always designated by the numeral 1 and the layer whose thickness is to be measured as shown at 2.

In FIG. 1, 3 is a permanent magnet whose N. and S. poles are connected to the soft iron pole pieces 4 and 5. The magnetic flux is indicated in broken lines. $\phi_1$ designates the flux passing through the layer to be measured, and $\phi_2$ is part of the flux which is closed at the back of the system. The strength of the flux $\phi_2$ is a function of the reluctance encountered by flux $\phi_1$. Therefore, the flux $\phi_2$ indicates the distance of the poles 4 and 5 from the supporting member 1, which distance is the thickness of the non-magnetic layer 2.

In the apparatus of FIG. 2, the path for the shunt circuit $\phi_2$ is closed by a soft iron piece 6 over the air-gap $a$. If the gauge is moved closer to the ferromagnetic support 1, the flux $\phi_1$ which flows through the ends of the pole pieces which are opposite the probe and are equipped with the measuring coils 8 and 9, increases while the flux $\phi_2$ through the pole ends equipped with coils 10 and 11 and through the member 6 decreases. With suitable series connection of the four measuring coils, the sum of the flux changes is indicated at the magnetic fluxmeter 12, which can be calibrated to show directly thickness units.

It is a specific advantage of the invention that the magnetic measuring circuit can be made very small and substantially without leakage flux. Such an embodiment of the invention is illustrated in FIG. 3. Such arrangement is particularly suitable to measure the thickness of layers at the inside of tubes, between parallel walls, or on gear flanks (see FIG. 5). A magnet 13 is provided with soft iron pole pieces 14 and 15 whose ends contacting the non-magnetic layer terminate in curved or hemispherical contact faces which may be covered with a scrub-resisting coating, e.g., hard chrome. Between the iron return path 16 and the two poles 14 and 15, the magnetic field strength is measured by means of a field measuring member e.g. a field plate 17 and a suitable indicating instrument 18; the member 17 is arranged in the air gap $a$, and the indicating instrument may be calibrated to show thickness units. By adjusting the air gap $a$, the measuring range can be influenced. As field measuring device, I can use a Hall effect device or, with particular advantage, a field plate whose reluctance is a function of the magnetic field and permits a particularly small construction of the system.

A different construction is shown in FIG. 4, wherein the permanent magnet 19 is connected to two poles 20 and 21; between the poles, there is an air gap in which the field measuring device 22 is arranged and connected to the indicating instrument 23.

As in the thickness gauge of the invention, it is a static magnetic field which is used for the measurement, the properties of the non-magnetic layer to be measured do not affect the measurement. Therefore, layers of insulating material as well as those of electrically conductive materials and metals can be measured with the same calibration.

Though in the illustrated embodiments, the magnetic flux is provided by a permanent magnet, it is also possible to energize the measuring circuit by an electric direct current which flows through an excitation winding disposed on the measuring system completely consisting of iron. By suitable variation of the direct current, it is easy to adjust the system to a different sensitiveness or to different measuring ranges.

I claim:
1. A magnetic thickness gauge for measuring the thickness of a layer of non-magnetic material on a ferromagnetic support comprising a permanent magnet having its north and south poles disposed on an axis parallel to the layer to be measured,
- a pole piece for each of said poles disposed transverse to said axis,
- each pole piece having an end projecting beyond said magnet toward said layer,
- a hemispherical surface on each projecting end for contact with said layer to form a magnetic circuit with said ferromagnetic support,
- each pole piece having another end opposite to its projecting end a ferromagnetic plate spanning the said another ends of the pole pieces to form a magnetic shunt circuit,
- said ferromagnetic plate cooperating with said pole pieces to define a shield for the permanent magnet and preclude magnetic flux straying therefrom,
- means defining an air gap in the magnetic shunt circuit between the said another ends of the pole pieces and said plate, and
- means including a Hall effect device in said air gap to measure the magnetic flux of the magnetic shunt circuit.

References Cited

UNITED STATES PATENTS

| 1,925,904 | 9/1933 | Mayne | 324—34 X |
| 2,827,609 | 3/1958 | Smith. | |
| 3,340,468 | 9/1967 | Chu | 324—45 X |

FOREIGN PATENTS

| 378,983 | 8/1932 | Great Britain. |
| 601,490 | 5/1948 | Great Britain. |

RUDOLPH V. ROLINEC, *Primary Examiner.*

ALFRED E. SMITH, *Assistant Examiner.*

U.S. Cl. X.R.

324—45